Dec. 28, 1954 R. J. BUEHLER 2,698,140
HEATING PLANT CONTROL SYSTEM
Filed Oct. 14, 1949 4 Sheets-Sheet 1
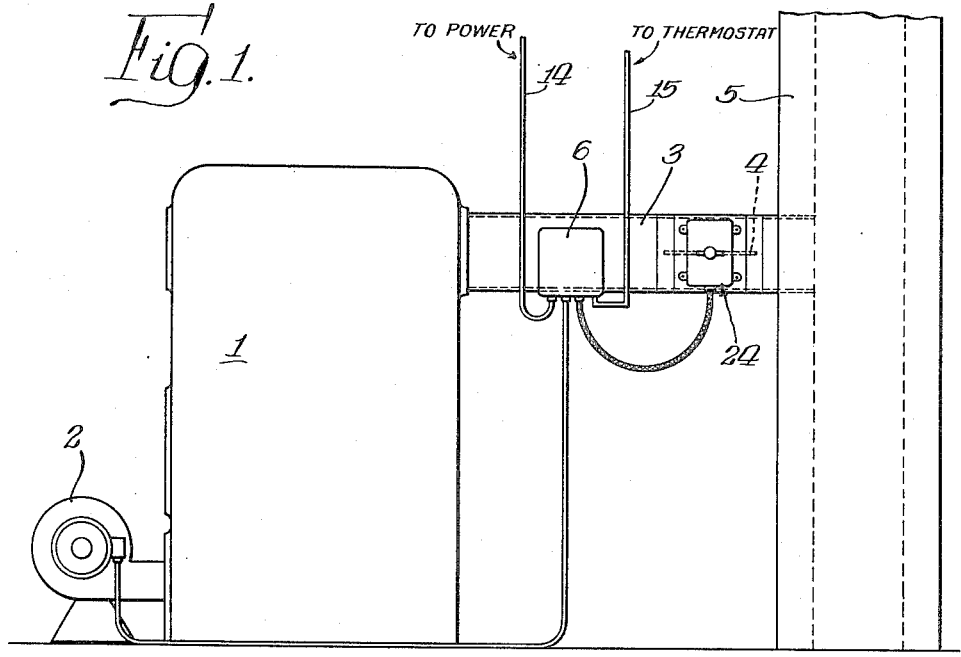
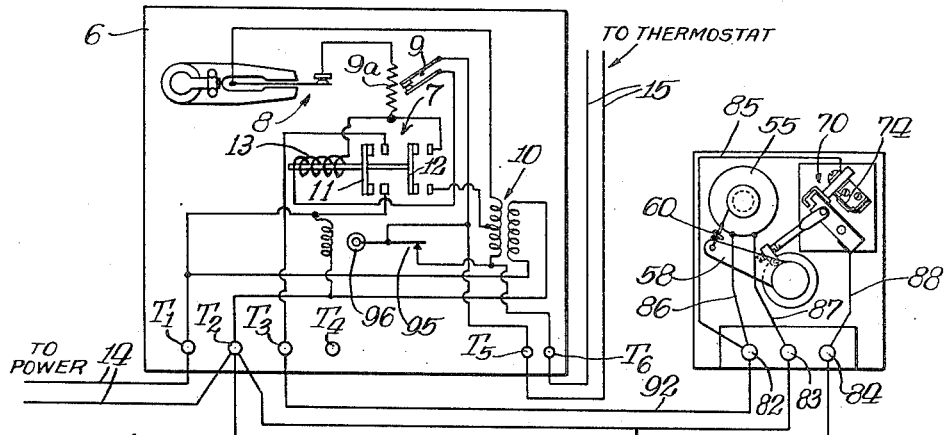
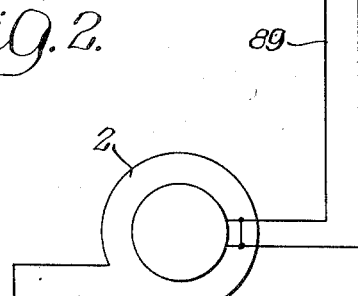
INVENTOR.
Randolph J. Buehler

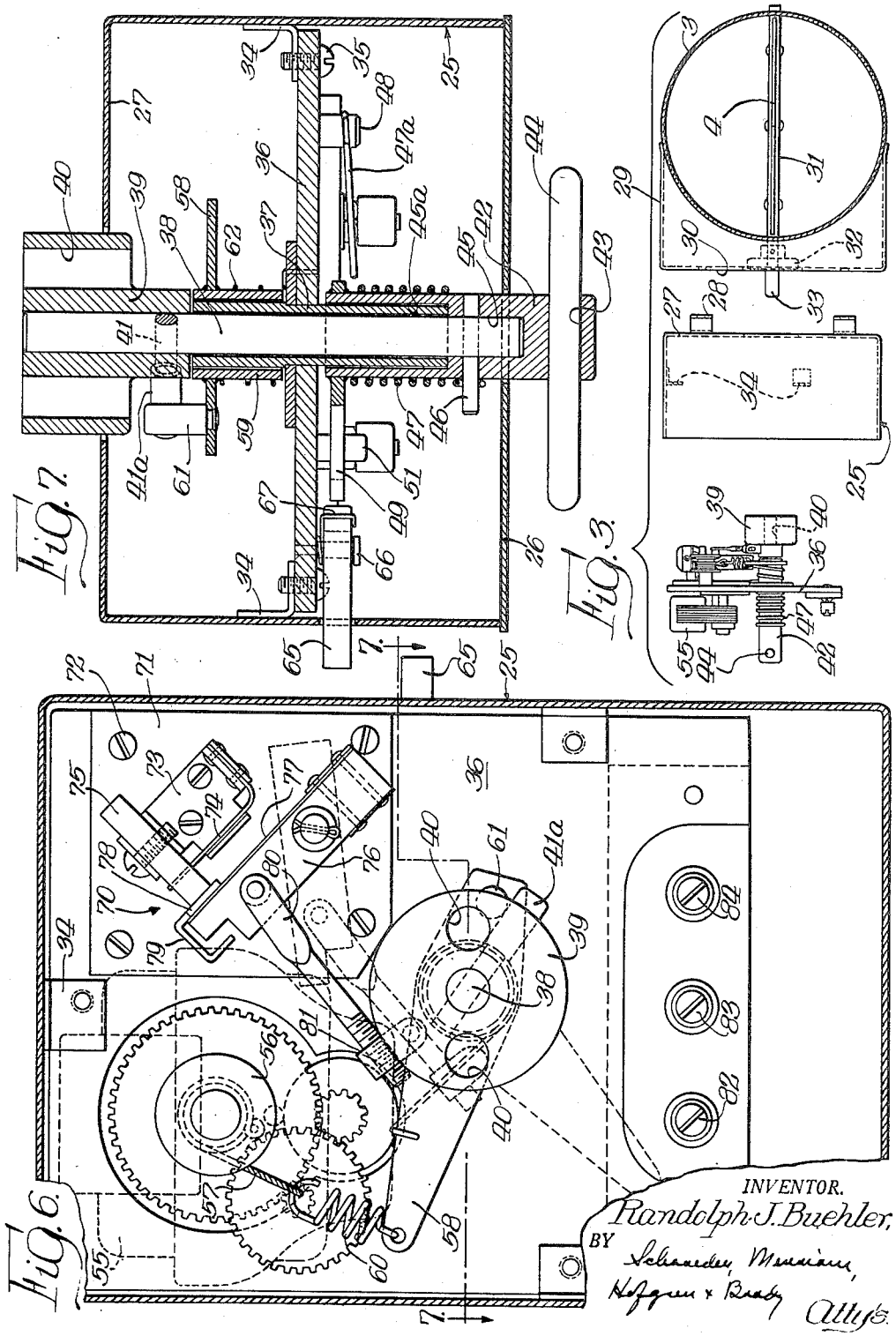

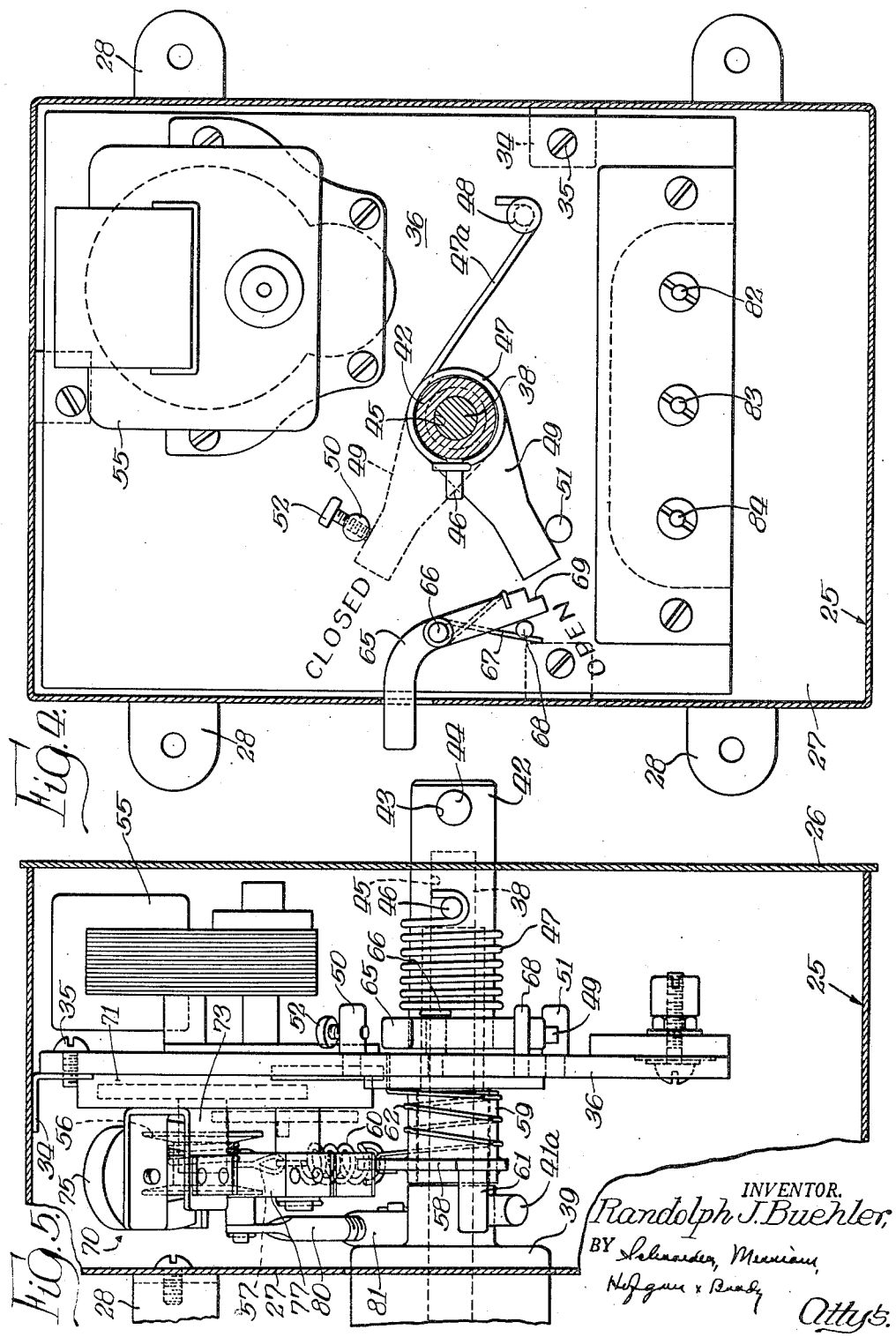

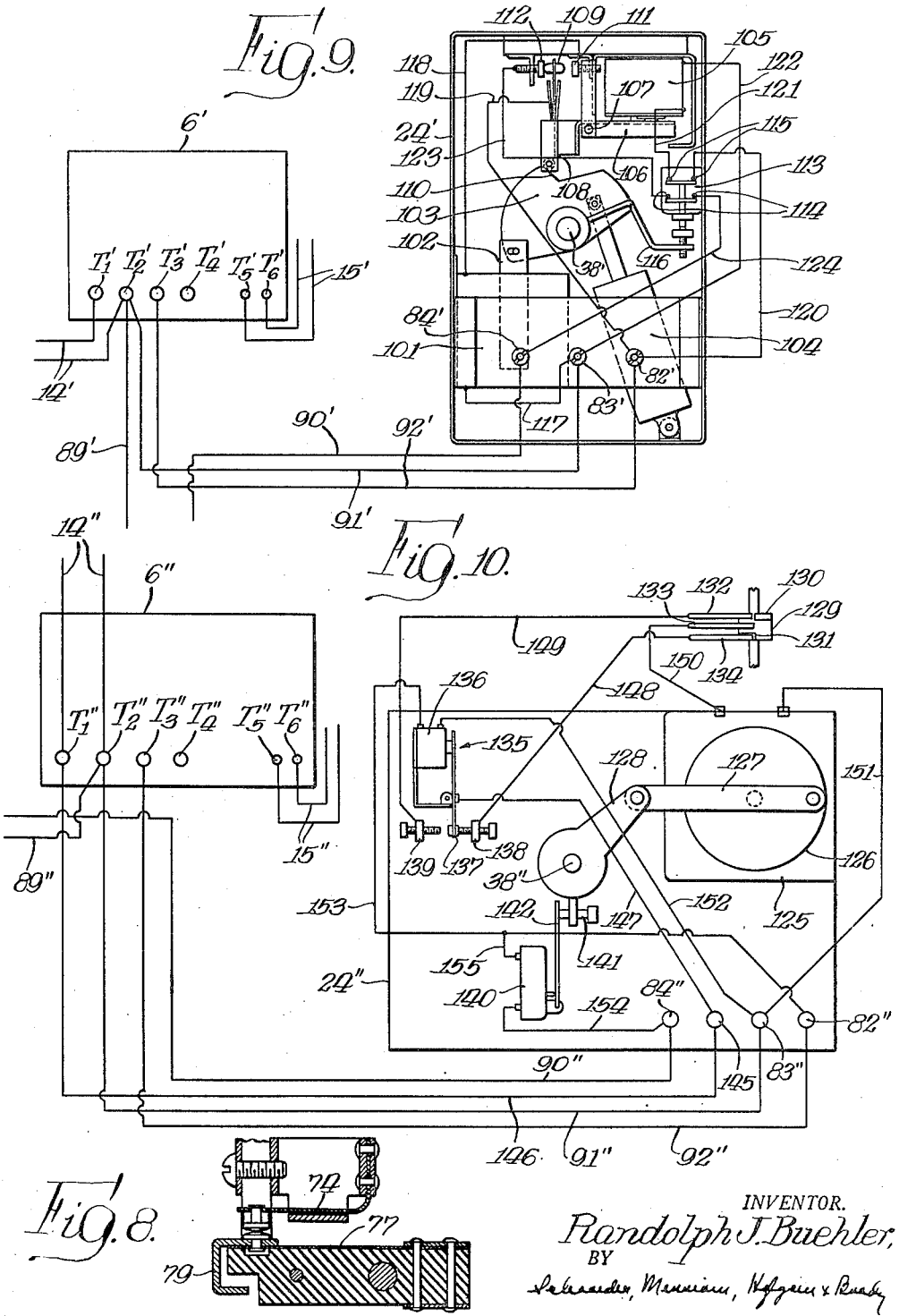

ature only and that the unit could be a stoker, or a valve for governing the supply of coal or gas, respectively. The heating plant is governed by a control system, best illustrated in Fig. 2, to render the heating plant completely automatic in operation.

United States Patent Office 2,698,140
Patented Dec. 28, 1954

2,698,140

HEATING PLANT CONTROL SYSTEM

Randolph J. Buehler, Chicago, Ill.

Application October 14, 1949, Serial No. 121,383

15 Claims. (Cl. 236—9)

The invention relates to control systems and parts thereof for heating plants of the combustion type.

A general object of the invention is to provide a new and improved control system for a heating plant rendering the plant more efficient, providing more uniform temperatures in the space heated, and assuring proper operation of the heating plant.

A more particular object is to provide a control system for an automatically fired heating plant which controls the stack pipe damper to conserve heat during off periods, the damper in turn exercising control over the supply of combustible material to the heating plant.

Another object is to provide a damper control unit which is readily connected to the heating plant, both physically as well as electrically.

Still another object is to provide a unit for incorporation in a heating plant control system in an easy and facile manner and without change of any secondary, that is, low voltage, circuits that might have in them timing devices or the like the proper operation of which could be interfered with by the incorporation of additional electrical means therein.

Yet another object is to provide a control system for a heating plant that is quiet and positive in operation, permits of either manual or automatic operation of the damper, and permits of convenient and economical manufacture, handling and shipping.

Other objects and advantages will be come apparent from the following detailed description taken in connection with the accompanying drawings, in which:

Fig. 1 is a side elevational view of a heating plant and a control system therefor embodying the features of this invention.

Fig. 2 is a diagrammatic view of the electrical portions of the control system.

Fig. 3 is an exploded view of the damper control means.

Fig. 4 is an enlarged sectional view of the damper control unit taken roughly in a plane lying just inside of the closure for the casing housing the unit.

Fig. 5 is a sectional view taken from the left in Fig. 4, again taken in a plane lying just within the side wall of the housing.

Fig. 6 is a view similar to Fig. 4 but from the opposite direction.

Fig. 7 is a sectional view taken approximately on the line 7—7 of Fig. 6 and rotated 180°.

Fig. 8 is an enlarged fragmentary view of one of the switches.

Fig. 9 is a diagrammatic view illustrating a modified construction.

Fig. 10 is another diagrammatic view illustrating a second modified form of the invention.

While the invention is susceptible of various modifications and alternative constructions, it is shown in the drawings and will hereinafter be described in a preferred embodiment and two modifications. It is not intended, however, that the invention is to be limited to the specific disclosures made. On the contrary, it is intended to cover all modifications and alternative constructions falling within the spirit and scope of the invention as defined in the appended claims.

Turning first to the preferred form of the invention disclosed in Figs. 1 to 8, inclusive, there is illustrated in Fig. 1 a typical heating plant. Such a plant comprises generally a heat generating unit 1, a combustible fuel supply unit 2, and a stack pipe 3 for the discharge of products of combustion, the pipe having therein a damper 4 and discharging to a stack or chimney 5. While the combustible fuel supply means is illustrated as an oil burning unit, it is to be understood that the drawing is illustrative only and that the unit could be a stoker, or a valve for governing the supply of coal or gas, respectively. The heating plant is governed by a control system, best illustrated in Fig. 2, to render the heating plant completely automatic in operation.

As above stated, it is an object and feature of this invention to perfect a control system in which increased efficiency and improved operation of the heating plant are obtained through the incorporation in the control system of damper control means, with such means in turn having the immediate control over the combustible fuel supply means. Moreover, it is a further object to so devise the damper control unit that it may form a part of the control system as initially installed, or so that it may quickly and easily be incorporated in an already installed and operating control system lacking this feature. To that end, the control system herein disclosed is in part composed of more or less standard and conventional units, particularly a relay unit 6. The relay unit 6 is common to heating plant control systems and its construction is so standardized and so well known to those skilled in the art that it is only diagrammatically illustrated and need be only briefly described.

Typically the relay unit 6 has a main switch 7, a combustion controlled switch 8, a safety switch 9, including a heater coil 9a and a transformer 10. The main switch 7 has a pair of contact bridging blades 11 and 12, is biased to open position, and is closed by energization of a solenoid 13. A series of terminals T1, T2, T3 and sometimes T4 is located at the bottom of the relay unit 6. Terminals T1 and T2 are conventionally connected to power leads 14 while terminals T2 and T3 are either directly or through various other means connected to the combustible fuel supply means 2. Combustion switch 8 is normally closed and is controlled in well known manner by a bimetallic helix projecting into the stack pipe and arranged to open the switch 8 upon initiation of combustion. Safety switch 9 also is normally closed and remains closed except in the event that combustion does not occur when heat is called for, under which condition combustion switch 8 remains closed maintaining energization of heater coil 9a, thereby causing switch 9 to open.

Primary control of the relay unit 6 and hence of the entire control system is under a control switch, usually a temperature responsive switch such as a room thermostat RT which thermostat is by leads 15 connected to terminals T5 and T6 of the relay unit, which terminals are in turn so connected in circuit with the secondary of the transformer 10 as to form a relay energizing circuit, including switches 8 and 9 and heater coil 9a, and a holding circuit which eliminates the combustion switch 8 but includes blade 12 of the main switch 7. Blade 11 of the main switch bridges terminals T1 and T3 to supply energy to the combustible fuel supply unit 2. It is believed apparent that to the extent described the control system is typical and standard.

In order to prevent the great loss of heat due to the escape thereof up the stack during the off period of the heating plant with the resultant loss of efficiency and increased variation in temperature maintained because of the lag resulting from the necessity of heating a cold furnace whenever the thermostat calls for additional heat, means is provided herein to govern the damper 4 in such manner as to prevent the loss of heat up the stack in the off period while not interfering with the escape of the products of combustion during the on period. To that end, mechanism is provided for closing the damper during the off period and opening the damper prior to the supply of combustible fuel in response to a call for additional heat by the thermostat. This mechanism is so arranged and so incorporated in the control system that it has a direct and immediate control of the supply of combustible fuel and thereby guards against the hazards created by initiation of combustion while the damper is closed.

The damper control mechanism, hereinafter generally designated 24, is a unitary device in turn composed of sub-units to facilitate manufacture, shipping repair and incorporation in a control system either initially or as an addition to an existing and installed system. To that end, the unit comprises a housing composed of a main portion 25 and a cover or closure portion 26 (see Fig. 5). The rear wall 27 of this housing carries brackets 28 by means of which the housing may be secured to that section of the stack pipe containing the damper 4. This section of the stack pipe conventionally has formed as a part thereof a channel section 29 providing a plane surface or wall 30 disposed at right angles to the shaft 31 of the damper 4. Secured to the shaft 31 outwardly of the stack pipe 3 is a coupling member 32 in the form of a yoke having a pair of prongs 33 extending outwardly of the channel section 29 parallel with the shaft 31.

Secured to the main housing portion 25 internally thereof are three ears or brackets 34 to which is removably secured, as by bolts 35, a mounting plate or panel 36. Extending through the plate and having a forced fit therein is a sleeve 37 forming an elongated bearing for a shaft 38. Mounted on one end of the shaft 38 is a coupling member 39 complementary to the coupling member 32, being formed with bores 40 for receiving the prongs 33. The coupling member 39 is held against both axial and rotational movement relative to the shaft 38 by means of a pin 41 inserted radially through the coupling member 39 and into the shaft 38. For reasons presently to be made known, the pin 41 has an external extension 41a.

The opposite end of the shaft 38 carries a tubular part 42, a portion of which projects outwardly of the housing through an aperture in the closure 26 and in the projecting portion is formed with a diametrical bore 43 for the reception of a rod 44 for manual actuation of the damper. The tubular part 42 has a stepped axial bore the smaller and outermost part 45 of which receives the end of the shaft 38 and the larger and inner part 45a of which receives rotatably the sleeve 37. The tubular member 42 is rotatable on the sleeve 37 but is fixed against both longitudinal and rotational movement relative to the shaft 38 by means of a pin 46. It is to be noted that by this arrangement the shaft 38 is retained rotatably but in fixed axial position in the sleeve 37. Also to be noted is the fact that rotation of the tubular member 42 is by the shaft 38 transmitted to the coupling member 39 and vice versa.

Encircling the inner end of the tubular member 42 is a torsion spring 47 one end of which is attached to the pin 46 and the other end of which has a straight extension 47a terminating in a hook adapted to engage a stud 48 on the panel 36. The spring 47 is so designed as to tend to rotate the shaft 38 in such direction as to swing the damper to closed position. To limit the rotation imparted to the damper by the spring 47, the tubular member 42 has welded or otherwise secured to its inner end an arm 49, and projecting from the panel 36 in a position to be struck by the arm are studs 50 and 51, respectively, determining the closed and the open position of the damper. Stud 50 preferably has threaded therethrough an adjusting screw 52 for varying the closed position of the damper. All safety codes require that even in closed position the damper be rotated a certain minimum number of degrees from fully closed position. With different fuels, this minimum opening should be varied and can herein be readily effected by adjustment of the screw 52.

To actuate the damper automatically, there is incorporated in the damper unit 24 an electric motor 55 of the torque type. The motor is removably mounted on one side of the panel 36. Driven by the motor either through suitable gearing or by mounting directly on the armature shaft of the motor is a pulley 56 disposed on the opposite side of the panel from the motor 55. Secured at one end to and wound on the pulley 56 is a flexible cable 57 forming part of a driving train or linkage between the pulley and the coupling member 39. The balance of the drive train includes an arm 58 rigid with a sleeve 59 rotatably mounted on that end of the sleeve 37 projecting inwardly from the panel 36. The longer end of the arm 58 is attached to the cable 57 through a tension spring 60 while the shorter end carries a pin 61 projecting laterally of the arm and into the path of the projecting portion 41a of the pin 41. The connection between the motor and the damper is thus a one-way connection or drive. Surrounding the sleeve 59 is a torsion spring 62 having one end anchored in the panel 36 and the other end engaging the arm 58 and designed to tend to rotate the arm in a counterclockwise direction, as viewed in Fig. 6, that is, toward the position assumed when the damper is closed. Due to the one-way connection between the damper and the motor, the spring 62 exercises no damper-closing influence save as it reduces the closing force required by tending to unwind the cable 57.

It is sometimes desirable manually to rotate the damper to open position and retain the same in open position for a period of time while the system is being checked or tested. To hold the damper in open position while yet assuring return to automatic control should the attendant fail to make the restoration, a bell crank latch 65 is provided. The bell crank is pivoted at 66 on the panel 36 and has one end projecting outwardly through the casing 25 for manipulation without necessity for removal of the closure 26. The bell crank is by a torsion spring 67 urged toward a stop pin 68 and when against the pin is out of the path of the arm 49. By counterclockwise rotation, the latch may be swung into the path of the arm 49 and is provided at its inner end with a notch 69 for engaging the arm 49. To operate the latch, the damper is by means of the rod 44 rotated to open position, that is, with the arm 49 abutting the stud 51. While in that position the latch 65 is swung counterclockwise to engage the arm 49 and, while held in that position, rod 44 is released restoring the damper to the action of the torsion spring 47 which tends to rotate the same to closed position. The force of the arm 49 under the influence of the torsion spring 47 prevents the much lighter spring 67 from withdrawing the latch from out the path of the arm and thus the damper is held in open position. Should the attendant leave without releasing the latch 65, it will be automatically released as an incident to the first call for heat by the thermostat. With such call for heat, the motor 55, as will presently be made known, actuates the shaft 38 to rotate the damper to open position thereby tending to rotate arm 49 in a counterclockwise direction as viewed in Fig. 4, and thus relieving the force of the arm on the latch 65. The latch is thus freed to the action of the spring 67 and is swung out of the path of the arm, leaving the damper free to close when the thermostat ceases to call for heat.

Also mounted on the panel 36 to be actuated in accordance with the position of the damper as directly from the damper as is feasible is a switch 70 exercising primary control over the combustible fuel supply means 2. The switch 70 has a base 71 secured by means such as screws 72 to the panel 36. Mounted on the base is a stationary contact means 73 having a leaf spring contact 74 terminating between the ends of a permanent magnet 75. Pivotally mounted on the base 71 is a member 76 carrying a leaf spring 77 riveted at one end to the member 76 and terminating at its free end in a contact for engagement with the contact 74 and an armature 78 to be attracted by the magnet 75 and result in a snap action engagement of the contacts in the final stages of movement of the switch toward closed position. The armature 78 includes a U-shaped part 79 overlying the end of the member 76. Considerable play is provided between the U-shaped portion 79 and the member 76 to provide the freedom necessary for the snap action closing of the switch and to provide for a similar quick breaking of the contacts upon opening of the switch. The member 76 is by a link 80 connected to the coupling member 39 so as to be pivoted to switch-closing or switch-open position, respectively, as the damper is swung to open or closed position. The link 80 is pivotally connected to the member 76 and is threaded into a short link 81 which is in turn pivotally connected to the coupling member 39.

The damper unit is completed by three terminals 82, 83 and 84 mounted on the lower part of the panel 36. Terminal 82 is by a lead 85 connected to the stationary contact 74 of the switch 70 and is by lead 86 connected to one terminal of the motor 55. The other terminal of the motor is by a lead 87 connected to the terminal 83 and the movable or pivotal contact of the switch 70 is by a lead 88 connected to the terminal 84.

Fig. 2 shows how readily the damper unit is initially or subsequently incorporated in a control system. Terminal T2 of the relay unit 6 is by a lead 89 connected to one terminal of the combustible fuel supply means 2. A lead 90 connected at one end to the remaining terminal of the fuel supply means 2 and normally connected to the terminal T3 is simply run over to the damper unit and connected to the terminal 84. To complete the incorporation of the damper unit in the control system, it is only necessary to connect terminal T2 with terminal 83 by means of a lead 91 and to connect terminal T3 with terminal 82 by a lead 92. It is believed apparent that the incorporation of the damper unit has been accomplished without disturbance of the low voltage thermostat circuit and without fuss or bother by the simple expedient of employing two additional lead wires. The simplicity of the electrical connections is equaled by the simplicity of the mechanical addition of the damper unit. If the damper already has a forked yoke 32 or such a yoke is installed, the damper unit is physically incorporated simply by pressing the coupling member 39 axially into engagement with the forked coupling 32 and securing the entire damper unit to the channel member 29 through the medium of bolts or screws passing through the lugs 28. Repair or replacement of the damper unit is made with equal facility. Access to the terminals 82, 83 and 84 and to the parts mounted on the outer face of the panel 36 is had by simple removal of the closure 26. Access to the parts mounted on the rear face of the panel 36 is had by removal of three screws 35 and withdrawal of the panel and the parts mounted thereon from within the casing 25.

For a more ready understanding of the invention, the operation of the system will be briefly described. Let it be assumed that the damper is closed and that the thermostat is not calling for heat. Under this assumption, the main switch 7 is open, the combustion switch 8 is closed, the safety switch 9 is closed, and the damper switch 70 is open. If now the thermostat calls for heat, an energizing circuit for the relay coil 13 is completed through the combustion switch 8 and safety switch 9. With energization of the coil 13, the main switch 7 is closed with blade 11 thereof bridging the terminals T1 and T3 so as to supply energy to terminal T3, and blade 12 completes a holding circuit independent of the combustion switch 8 but including the safety switch 9. Thus subsequent opening of switch 8 with initiation of combustion does not deenergize relay coil 13. Connection of the terminal T3 to the power leads does not immediately activate the fuel supply means 2 because the fuel supply means 2 is in the system as disclosed under the control of the damper switch 70 connected in series with the main switch 7. Closure of the main switch 7 does, however, through leads 92, 86, 87 and 91 complete a circuit for the motor 55. Operation of the motor 55 winds cable 57 on the pulley 56 and rotates the damper to open position against the opposition of torsion springs 47 and 62. It is a feature of this invention, the importance of which will later become apparent, that the tension spring 60 is stronger than the combined strength of the torsion springs 47 and 62, and that the torsion of the motor is such that it is able slightly to extend the spring 60. Thus as the cable 57 is wound on the pulley the shaft 38 is swung toward damper-open position until the arm 49 rests against stud 51. Thereafter the motor 55 extends the spring 60 somewhat before the tension of the spring balances the torque of the motor and the motor comes to rest.

In this rotation of the damper to open position, link 80 swings member 76 clockwise, as viewed in Fig. 6, and just prior to abutment of the arm 49 with the stud 51 switch 70 snaps closed. A circuit is now completed to the fuel supply means 2 through the stack switch 70. There is thus positive assurance that there can be no supply of combustible fuel until the damper is swung to open position.

When the temperature of the room is raised to the desired degree, the thermostat opens and breaks the circuit through the relay coil permitting the main switch to return to its normal open position. Such opening of the main switch, of course, breaks the circuit to the motor 55 and also breaks the circuit to the fuel supply means 2. With the motor 55 now no longer energized, the damper 4 is free to return to closed position under the influence of the torsion spring 47. It is in the return of the damper to closed position that the relative strengths of the various springs above described comes into play to assure prompt and complete return of the damper to closed position. Immediately upon loss of torque of the motor, an unwinding impulse is given to the pulley 56 and the motor by the tension spring 60. This spring, it will be recalled, was extended after the arm 49 had struck the fixed stud 51. Thus the initial returning impetus given to the motor 55 is not that of the torsion spring 47 but is that of the tension spring 60, one end of which is anchored temporarily by a fixed abutment. In this way the motor is started spinning in a cable unwinding direction, thereby obviating the necessity of the torsion spring 47 to overcome the inertia and the friction of the motor and the gearing, and the torsion spring is thus able quickly to return the damper to closed position.

With closure of the damper, the heat of the heat generating unit 1 is retained and prevented from escaping up the stack as is the case in systems where the damper is not controlled in this manner. In this way the retained heat is available to heat the room and lengthens the period of heat supply for each firing of the heat generating means. This retained heat, moreover, prevents the heat generating means from dropping to a low temperature before the thermostat again calls for heat thereby making the system more quickly responsive for it is now unnecessary first to raise the temperature of the heat generating means from a low value as is customarily the case.

In certain installations, it is desirable that the heat generating means 1 operate for a given length of time at given intervals even though the thermostat may not call for heat. This is readily brought about by the incorporation of a motor-driven timer switch in the relay unit 6. Such a switch is indicated at 95 and is connected in parallel with the thermostat. A motor for driving the switch is represented at 96 and is connected to terminals T1 and T2 so as to be driven constantly.

A first modified form of the invention is shown in Fig. 9. In this form the system is closely similar to that disclosed in Figs. 1 to 8, inclusive, in that there is employed a relay unit 6' of identical construction with the unit 6 and a damper unit 24' adapted to be physically attached and electrically incorporated in the system with the same facility as the damper unit 24 and still including a damper controlled switch exercising control over a combustible fuel supply means. As will readily be seen from examination of Fig. 9, the relay unit 6' still has a plurality of terminals T1', T2', T3', T4', T5' and T6', with power leads 14' connected to the terminals T1' and T2' and leads 15' connected to the terminals T5' and T6' and leading to the thermostat. A lead 89' is connected at one end to the terminal T2' and, as in Fig. 2, is connected to one terminal of a fuel supply means. The damper unit 24' has three terminals 82', 83' and 84' with the terminal 84' connected by a lead 90' to the remaining terminal of the fuel supply means, a lead 91' connecting the terminals T2' and 83', and a lead 92' connecting the terminals T3' and 82'.

The damper unit 24' is still adapted to be mechanically coupled to the damper by means of a simple axial movement, and to that end still carries on the end of a shaft 38' a coupling member (not shown) similar to the member 39. In place of a torque motor, however, for rotating the shaft there is employed in this form of the invention a solenoid 101 having an axially movable core or armature 102 pivotally connected at its external end to a cam-like member 103 fixed on the shaft 38'. Preferably, there is associated with the cam-like member 103 a dashpot 104 for retarding the action of the solenoid to prevent the strain and shock due to sudden arrest of the damper at the end of opening or closing movements. It will also be appreciated that there is still present means such as the torsion spring 47 of the preferred form for urging the damper to closed position. Also incorporated in the unit is a smaller solenoid or relay 105 having an armature 106 pivotally mounted at 107 and carrying both a detent 108 and a movable contact 109. When the solenoid 101 is energized to rock the damper to open position and the relay 105 then energized as shown in Fig. 9, the detent 108 is swung downwardly to bear against a shoulder 110 formed in the periphery of the cam-like member 103 and thereby serving to hold the damper in open position. This has the distinct advantage that the solenoid 101 may then be deenergized and the damper held in open position by the continued energization of the relay 105. In this way a much smaller current is consumed and, above all, the small relay 105 can be constructed to avoid chattering, whereas it is difficult and substantially impossible to avoid chattering in a large solenoid such as the solenoid 101.

The movable contact 109 is adapted to make contact alternately with stationary contacts 111 and 112, respectively, as the relay 105 is deenergized or energized. Completing the damper unit is a double switch 113 comprising a pair of terminals 114 and a blade forming the stack switch, and a pair of terminals 115 and a blade forming a holding circuit switch. This pair of switches is normally open and is under the control of the damper through the medium of a lever 116 projecting from the shaft 38'.

The various solenoids and switches are connected in circuit as follows: One terminal of the solenoid 101 is by lead 117 connected to the terminal 83'. The other terminal of the solenoid 101 is by lead 118 connected to the contact 111. The movable contact 109 is by a lead 119 connected to the terminal 82'. It will thus be seen that closure of the main switch of the relay unit 6' will complete a circuit for energization of the solenoid 101 from the terminal T1' to T3', thence through lead 92', lead 119, contacts 109 and 111 which are now closed, lead 118 to the solenoid 101, thence through lead 117 and lead 91' to terminal T2'. Terminal 82' is also by lead 120 connected to one of the terminals 115, the other being by a lead 121 connected to one terminal of the relay 105, the other terminal being by lead 122 connected to the terminal 83'. Thus it will be seen that movement of the damper to open position will through the switch unit 113 and bridging of the terminals 115 complete an energizing and holding circuit for the relay 105. With the energization of the relay 105, the armature 106 is attracted and swung counterclockwise, as viewed in Fig. 9, thereby pivoting the detent 108 into holding position and swinging contact 109 from engagement with the contact 111 to contact 112. The energizing circuit for the solenoid 101 is now broken and a circuit completed through contacts 109 and 112, and the damper switch (terminals 114) for energization of the fuel supply means. This circuit includes, in addition to the switches named and the lead 119, a lead 123 connecting contact 112 and one of the terminals 114, and a lead 124 connecting the remaining one of the terminals 114 and the terminal 84'. It will be seen that in this form of the invention the damper unit 24' provides a pair of switches connected in series in the energizing circuit for the fuel supply means. When the main switch of the relay unit 6' is open as an incident to the thermostat ceasing to call for heat, all power to the damper unit is, of course, cut off and, above all, the relay 105 is deenergized thereby permitting detent 108 to be cammed out of holding position and the damper returned to closed position.

Fig. 10 discloses a second modification of the invention. Here again the damper unit 24'' is adapted and intended for use with a standard relay unit 6'' having terminals T1'' to T6'', inclusive. Power is again supplied to the terminals T1'' and T2'' by leads 14'' and a thermostat is connected to terminals T5'' and T6'' by leads 15''.

The damper unit 24'' is still constructed for ready physical attachment to the damper shaft and the stack pipe, as described in connection with the preferred form of the invention. Suffice it to say, therefore, that there is a shaft 38'' carrying a coupling member similar to the member 39. In this form the damper is swung from one position to another by a conventional electric motor 125 acting through a disk 126 driven by the motor and a link 127 pivotally connected at one end to the disk 126 eccentrically thereof and pivotally connected at the other end to an arm 128 fast on the shaft 38''. The motor also drives a commutator switch means having a drum 129 with nonconducting segments 130 and 131 and three fingers 132, 133 and 134. As will presently become apparent, the system is designed to have the motor rotate the disk 126 through cycles of 180° for effecting the opening and the closing of the damper.

Controlling the circuits that are conditioned by the commutator switch is a relay switch 135 having an actuating coil 136, a pivoted armature carrying a movable contact 137, and a pair of stationary contacts 138 and 139. Completing the damper unit 24'' is a damper switch 140 actuated from the shaft 38'' by a projecting finger of the arm 128 carrying an adjustable screw 141 acting on a lever 142 forming a part of the switch 140.

The damper unit 24'' has three terminals 82'', 83'' and 84'' connected to the relay unit 6'' or to the fuel supply means in the same manner as the previously described embodiments. More particularly, terminal 82'' is by lead 92'' connected to the terminal T3''. Terminal 83'' is by lead 91'' connected to terminal T2'' and terminal 84'' is by lead 90'' connected to the fuel supply means. A fourth terminal 145 is by a lead 146 connected to the terminal T1''. This terminal 145 is by a lead 147 connected to the movable contact 137 of the relay switch 135, thereby making power available at the contact 137 at all times and independently of closing of the main switch of the relay unit 6''. The remaining internal connections of the damper unit 24'' are as follows. The stationary contacts 138 and 139 of the relay switch 135 are by leads 148 and 149 connected, respectively, to the fingers 134 and 132 of the commutator switch. The middle or common finger 133 is by lead 150 connected to one terminal of the motor 125, the other terminal being by lead 151 connected to the terminal 83''. Coil 136 of the relay switch 135 has one of its terminals connected by lead 152 to the terminal 83'' and the other of its terminals connected by lead 153 to the terminal 82'' to provide an energizing circuit for the relay which is under the control of the main switch of the relay unit 6'' and hence under the control of the thermostat. Damper switch 140 is by leads 154 and 155 connected, respectively, to the terminal 84'' and terminal 82'', the latter connection including a part of the lead 153.

As shown in Fig. 10, the various parts of the damper unit 24'' are in damper-open position with the thermostat still calling for heat. A brief description of the operation of the system will thus be made starting with the above described conditions rather than from the opposite condition, that is, where the damper is closed and the thermostat is about to call for heat. When the room temperature reaches the desired value, the thermostat opens, thereby causing opening of the main switch of the relay unit 6''. This will deenergize coil 136 of the relay 135 and movable contact 137 will swing back to its normal position, which is in engagement with contact 139. Accordingly, a circuit is established from contact 137 which, as above stated, is always connected to one of the power leads through the terminal T1'' through contact 139, lead 149, fingers 132 and 133 previously bridged by the drum 129 of the commutator switch, lead 150 to the motor, and from the motor through lead 151 to terminal 83'' which is connected to the terminal T2'' and thus to the power leads. The motor 125 then runs turning the disk 126 through a cycle of 180°. During such rotation of the disk, the arm 128 is swung counterclockwise, thereby opening the damper switch 140 and breaking the circuit to the fuel supply means. At the end of the 180° rotation of the disk 126, finger 132 of the commutator switch strikes the nonconducting segment 130 to break the motor circuit and finger 134 runs off the nonconducting segment 131 to be connected to common finger 133 through the drum 129. The mechanism is now again at rest with a motor circuit conditioned for completion by energization of the coil 136 of the relay 135 under the control of the thermostat. When the thermostat again calls for heat, the main switch of the relay unit 6'' is closed, thereby completing a circuit to the coil 136, the armature of the relay is attracted swinging contact 137 into engagement with contact 138 completing the previously conditioned circuit through the fingers 134 and 133, and thus initiating another cycle of operation of the motor 125. This is a damper-opening cycle. The arm 128 is swung clockwise and toward the end of the cycle the screw 141 through lever 142 closes the damper switch 140 to again complete the circuit to the fuel supply means.

The term "thermostat" as employed in the specification and claims is intended to mean any temperature responsive switch be it designed for operation in air, or water or any other medium.

The term "space" as employed in the specification and claims is intended to mean any cubical unit large or small, such as a room or boiler, and independently of the medium contained be it air, water or some other fluid.

I claim as my invention:
1. A stack pipe damper control unit comprising, in combination, a housing including a removable closure and means for readily attaching the housing to the stack pipe, a panel removably mounted within said housing, a shaft rotatably journaled in said panel and having at one end thereof a coupling part adapted for ready engagement with the damper, electric motor means mounted on said panel and operatively associated with said shaft to rotate said shaft upon energization of the motor means, a switch mounted on said panel and operatively associated with said shaft to be open when the damper is closed and closed when the damper is open, internal circuits including said motor means and said switch and terminals to which said circuits are connected also carried by said panel and accessible by removal of said closure member to facilitate connection of the unit in an electrical control system.

2. A control unit for the damper in a stack pipe, the damper having a coupling member on the shaft thereof comprising, in combination, a housing having a removable closure member and means for readily mounting said housing on the stack pipe, a panel removably mounted within said housing, a shaft rotatably journaled in said panel, a coupling member complementary of the member on the damper fixed on one end of said shaft for coupling the shaft and the damper by relative axial movement, a motor means operatively associated with said shaft to rotate the same through a limited angle upon energization of said motor means, said shaft at the end opposite said coupling member projecting outwardly through said closure member for manual actuation of the damper, and a switch mechanically associated with said shaft to be open when the damper is closed and closed when the damper is open, said motor and said switch being mounted on said panel for removal as a unit with said shaft and said panel.

3. A control unit for a damper or the like, comprising, in combination, a housing, a panel mounted within said housing, shaft means rotatably journaled in said panel comprising a sleeve nonrotatably supported in said panel and extending to both sides thereof, a shaft rotatable in said sleeve and extending beyond both ends thereof, means serving as a collar secured to one end of said shaft against both relative axial and rotational movement, a second means serving as a collar secured to the other end of said shaft against both relative axial and rotational movement, a collar rotatably mounted on one end of said sleeve having a one-way connection with said shaft, an electric motor means mounted on said panel and operatively associated with said collar to tend to cause rotation of said shaft upon energization of said motor, means yieldably urging said shaft in the opposite direction, and a switch mounted on said panel and operatively associated with said shaft.

4. A control unit for a stack damper or the like comprising a panel, a shaft rotatably journaled in said panel, spring means urging said shaft in one direction of rotation, an electric motor of the torque type mounted on said panel, driving linkage between said motor and said shaft for rotating said shaft in a direction opposite to its bias including a tension spring of a strength when partially extended equaling the torque of said motor, and means for positively limiting rotation of said shaft in the direction imparted by energization of said motor.

5. A control unit for a stack pipe damper or the like comprising, in combination, a housing adapted to be mounted on the stack pipe, a panel in said housing, a sleeve nonrotatably fixed in said panel extending beyond both sides thereof, a shaft extending rotatably through said sleeve beyond both ends thereof, a coupling member on one end of said shaft, a pin having a radially projecting part securing said coupling member to said shaft against both relative axial and rotational movement, a tubular member secured against both relative and axial movement to the remaining end of said shaft and projecting loosely over the adjacent end of said sleeve, said tubular member having an arm fixed thereon and projecting radially therefrom, torsion spring means encircling said tubular member biasing said shaft in one direction of rotation, studs projecting from said panel and adapted to be engaged by said arm to limit the rotation of said shaft in either direction, a collar rotatable on that end of said sleeve projecting toward said coupling member having a pair of radially projecting arms, a pin on one of said arms projecting laterally therefrom into the path of said first mentioned pin to form a one-way connection between said collar and said shaft, a motor of the torque type mounted on said panel, and means forming a drive connection between said motor and the remaining arm on said collar comprising a pulley driven from said motor, a flexible cable secured at one end to said pulley and adapted to be wound thereon, and a tension spring interposed between the free end of said cable and said arm, said tension spring being stronger than said torsion spring and equaling the torque of said motor only after it has been at least partially extended.

6. A control unit for a stack pipe damper comprising a housing adapted to be mounted on the stack pipe, a panel within said housing, a shaft rotatably journaled in said panel having at one end a coupling member for cooperation with a complementary member on the damper and at the other end means for manual rotation of the shaft, means biasing said shaft in a direction resulting in closure of the damper, electric motor means for rotating the shaft in a direction to effect opening of the damper, a one-way connection between said motor and said shaft permitting opening movement of the damper without operation of said motor, an arm carried by said shaft, a latch manually swingable into the path of said arm to hold the shaft in damper-open position, and means for retracting the latch upon slight additional rotation of said shaft in a damper-opening direction.

7. A controller for a stack pipe damper or the like comprising a housing adapted to be mounted on the stack pipe, a panel within the housing, a shaft rotatably journaled in said panel having a coupling member at one end for cooperation with a complementary member carried by the damper, a cam-like disk nonrotatably fixed on said shaft, a solenoid mounted on said panel and connected to said disk to rotate said shaft upon energization of said solenoid, bias means tending to rotate said shaft in the opposite direction, and a relay having a detent cooperable with said cam-like disk upon energization of the relay to hold said shaft in rocked position independently of said solenoid.

8. A control system for a heating unit having a heat generating means, an electrically controlled fuel supply means, a stack pipe and a damper in the stack pipe comprising, in combination, means for actuating the damper including an electric motor means, a switch controlled by the damper motor to be open when the damper is closed and closed when the damper is open, a damper motor circuit, a fuel supply means circuit including said damper motor controlled switch in series, a master switch unit connected in series with said damper motor switch and the fuel supply means and having ultimate control over said damper motor circuit causing opening of the damper when said master switch is closed and closing of the damper when said master switch is open, a control switch responsive to temperature change and operatively associated with said master switch to close the same when the said control switch closes and to open the same when the said control switch opens, and a safety switch connected in series with the said control switch, the said safety switch having a heater controlled by a combustion responsive switch causing the said heater to be deenergized upon establishment of combustion thus permitting the said safety switch to remain closed, thereby maintaining the closed position of the master switch during the closed position of the control switch.

9. A control system for a heating unit having an electrically controlled heat generating means, a stack pipe and a damper in the stack pipe comprising, in combination, means for actuating the damper including an electric motor means, a switch controlled by the damper to be open when the damper is closed and closed when the damper is open, a damper motor circuit, a heat generating means circuit including said damper controlled switch in series, a master switch connected in series in said damper motor circuit to have ultimate control over said damper motor circuit causing opening of the damper when said master switch is closed and closing of the damper when said master switch is open, a control switch responsive to temperature change and operatively associated with said master switch to close the same when the said control switch closes and to open the same when the said control switch opens, and a safety switch connected in series with the said control switch, the said safety switch having a heater controlled by a combustion responsive switch causing the said heater to be deenergized upon establishment of combustion thus permitting the said safety switch to remain closed, thereby maintaining the closed position of the master switch during the closed position of the control switch.

10. A control system for a heating unit having an electrically controlled heat generating means, a stack pipe and a damper in the stack pipe comprising, in combination, means for actuating the damper including an electric motor means, a switch controlled by the damper to be open when the damper is closed and closed when the damper is open, a damper motor circuit, a heat generating means circuit including said damper controlled switch in series, a relay having an energizing coil and a pair of switches both being open when said coil is deenergized and closed when said coil is energized, one of said pair of switches being connected in series in said damper motor circuit to have ultimate control over said damper motor circuit, causing opening of the damper when said relay is energized and closing of the damper when said relay is deenergized, a control switch responsive to temperature change and in circuit with the coil of said relay to energize the same when said control switch closes and to deenergize the same when said control switch opens, a thermal safety switch connected in series with said control switch and said relay coil, and a combustion responsive switch exercising control over said thermal safety switch maintaining the same closed upon establishment of combustion in the heat generating means, the other of said relay switches upon closing establishing and energizing circuit for the coil of said relay still including said control switch and said safety switch but independent of said combustion responsive switch.

11. A control system for a heating unit having an electrically controlled heat generating means, a stack pipe and a damper in the stack pipe comprising, in combination, means for actuating the damper including an electric motor means, a switch controlled by the damper to be open when the damper is closed and closed when the damper is open, a damper motor means circuit, a heat generating means circuit including said damper controlled switch in series, a control switch responsive to temperature change and having ultimate control over said damper motor means circuit and through it over said heat generating means circuit, a thermal safety switch connected in series with said control switch, and a combustion responsive switch, said safety switch having a heater controlled by said combustion responsive switch causing said heater to be deenergized upon establishment of combustion.

12. A control system for a heating unit having an electrically controlled heat generating means, a stack pipe and a damper in the stack pipe comprising, in combination, means for actuating the damper including an electric motor means, a switch controlled by the damper to be open when the damper is closed and closed when the damper is open, a damper motor means circuit, a heat generating means circuit including said damper controlled switch in series, a control switch responsive to temperature change and having ultimate control over said damper motor means circuit and through it over said heat generating means circuit, a combustion responsive switch, and a delayed action switch under the control of said combustion responsive switch and connected in series with said control switch to take over control of said damper motor means circuit upon failure of combustion.

13. A control system according to claim 12, in which said electric motor means is a solenoid operatively associated with the damper to open the same upon energization of the solenoid; and there is an electrically operated retaining means operable upon energization following energization of said solenoid to hold the damper in open position, and an electrical circuit including said electrically operated retaining means and a switch actuated simultaneously with said damper switch.

14. A control system according to claim 12, in which said damper controlled switch includes a pair of movable blades for controlling a pair of independent circuits; there is a relay unit having an actuating coil and a pair of switches; said damper motor means circuit has one of said relay switches in series; and said heat generating means circuit has one of the damper controlled switches and the other of said relay switches in series.

15. A control system according to claim 12, in which said electric motor means is a rotary motor operatively associated with the damper to open and to close the same in successive cyclical operations, and in which there is a switch actuated by said motor; a relay having a pair of switches, said relay switches and said motor actuated switch connected to form parallel circuits alternately conditioned, then made and broken; and in which said damper motor circuit includes said motor and said parallel circuits in series.

References Cited in the file of this patent

UNITED STATES PATENTS

| Number | Name | Date |
|---|---|---|
| 422,956 | Malborg | Mar. 11, 1890 |
| 461,555 | Stout | Oct. 20, 1891 |
| 472,461 | Lundstedt | Apr. 5, 1892 |
| 1,833,388 | Barker | Dec. 1, 1931 |
| 2,076,768 | Denison | Apr. 13, 1937 |
| 2,117,787 | Bock | May 17, 1938 |
| 2,155,642 | Dewey | Apr. 25, 1939 |
| 2,185,978 | Dillman | Jan. 2, 1940 |
| 2,188,865 | Maynard | Jan. 30, 1940 |
| 2,226,081 | Stuart | Dec, 24, 1940 |
| 2,285,749 | Stuart | June 9, 1942 |
| 2,377,356 | Miller | June 5, 1945 |
| 2,414,112 | Malone | Jan. 14, 1947 |

FOREIGN PATENTS

| Number | Country | Date |
|---|---|---|
| 822,698 | France | Sept. 27, 1937 |